United States Patent Office 3,591,529
Patented July 6, 1971

3,591,529
PHOSPHORUS-CONTAINING POLYAMINES
Hans H. Stockmann, Plainfield, and Joseph Fertig, Elizabeth, N.J., assignors to National Starch and Chemical Corporation, New York, N.Y.
No Drawing. Continuation-in-part of abandoned application Ser. No. 722,200, Apr. 18, 1968. This application Feb. 2, 1970, Ser. No. 7,983
Int. Cl. C08g 33/16
U.S. Cl. 260—2P  2 Claims

ABSTRACT OF THE DISCLOSURE

High molecular weight polyphosphorus amidoamines comprising the products resulting from the reaction of an epihalohydrin with the reaction product of a polyalkylene polyamine and a phosphorus-containing reagent. The resulting chain extended products are applicable for use as pigment retention additives in paper, flocculants, anti-static agents and fire retardants.

RELATED APPLICATIONS

This application is a continuation-in-part of our copending application Ser. No. 722,200, filed Apr. 18, 1968 and assigned to the assignee of the subject application, now abandoned.

SUMMARY OF THE INVENTION

It is the prime object of this invention to prepare novel, high molecular weight, chain extended polyphosphorus amidoamines. Various other objects and advantages of this invention will be apparent to the practitioner from the following detailed description thereof.

Thus, the products of this invention comprise the novel chain extended polyphosphorus amidoamines resulting from the reaction of epihalohydrin with a polyphosphorus amidoamine intermediate which is produced by means of a condensation polymerization technique and which contains, as part of the molecule thereof, a repetitive chemical structure corresponding to the formula:

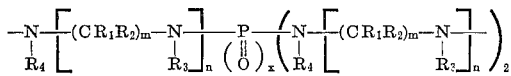

wherein $R_1$, $R_2$, $R_3$ and $R_4$ are radicals selected from the group consisting of hydrogen, alkyl and cycloalkyl radicals;
$m$ is an integer having a value of from 2 to 6 inclusive;
$n$ is an integer having a value of from 1 to 1000 inclusive; and,
$x$ is an integer having a value of from 0 to 1 inclusive.

With regard to the chain extended products, i.e. the products resulting from the reaction of the polyphosphorus amidoamine intermediates with an epihalohydrin, it is exceedingly difficult to present an accurate structural formula thereof. Thus, as the chain extension reaction proceeds and an increasing amount of condensation occurs with the epihalohydrin, the resulting product will exhibit a polymeric configuration which is far too complex to be accurately depicted.

DESCRIPTION OF THE PREFERRED EMBODIMENTS

In brief, the procedure for preparing the novel chain extended polyphosphorus amidoamines of this invention comprises reacting: (1) an epihalohydrin with (2) a polyphosphorus amidoamine intermediate; the latter intermediate resulting from the reaction of at least one low molecular weight polyamine with a phosphorus-containing reagent selected from the group consisting of phosphorus oxychloride, phosphorus trichloride and the bromine equivalents of each of the latter reagents.

A typical procedure for the preparation of the polyphosphorus amidoamine intermediates utilized in this invention comprises dissolving a low molecular weight polyamine in an aqueous or organic solvent and, thereafter, slowly adding a phosphorus-containing reagent to the polyamine solution while the latter is under agitation. Suitable organic solvents for this reaction include: benzene, xylene, dichloroethane, methyl ethyl ketone and heptane, etc. It is left to the discretion of the practitioner to determine the reaction time and temperature which is to be used, although typical reactions may be conducted at temperatures of from about 20 to 100° C. for periods of about 1 to 6 hours. The polymeric reaction product is usually recovered as the amidoamine salt and is typically retained as an aqueous solution since the latter form is convenient for use in the subsequent chain extension reaction in which these polymeric intermediates will be utilized.

The low molecular weight polyamines applicable for use in preparing these polyphosphorus amidoamine intermediates correspond to the formula:

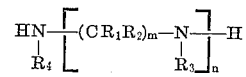

wherein $R_1$, $R_2$, $R_3$ and $R_4$ are radicals selected from the group consisting of hydrogen, alkyl and cycloalkyl radicals; $m$ is an integer having a value of from 2 to 6 inclusive; and, $n$ is an integer having a value of from 1 to 1000 inclusive. Thus, among the applicable polyamines are included: straight chain polyamines such, for example, as triethylenetetramine, tetraethylenepentamine, tetraethylenediamine, hexamethylenediamine, bis-hexamethylenetriamine, and pentaethylenehexamine; and cyclic polyamines such, for example, as piperazine, diaminoethyl piperazine and other substituted piperazines, etc. It should be noted that more than one of the applicable low molecular weight polyamines corresponding to the above formula may be simultaneously present in the reaction system. Thus, if desired, the practitioner may utilize crude residues containing mixtures of amines, e.g. those residues resulting from the interaction between dichloroethane and ammonia, as the polyamine starting material for the preparation of the amidoamine intermediates.

With regard to the phosphorus-containing reagents which may be utilized in preparing these intermediates, these reagents are typically selected from the group consisting of phosphorus oxychloride, phosphorus trichloride and the bromine equivalents of each of the latter reagents.

Although the previously described procedure is preferred for preparing the polyphosphorus amidoamine intermediates utilized in the process of this invention, it is also possible to prepare these intermediates by means of other reaction procedures. Thus, for example, the procedure may comprise reacting a low molecular weight polyamine, under anhydrous conditions, with the reaction product of anhydrous ammonia and a phosphoric acid anhydride such as phosphorus oxychloride and phosphorus pentoxide. In all instances, however, the resulting intermediate products are available for the subsequent chain extension reaction.

Thereafter, the above prepared polyphosphorus amidoamine intermediates are chain extended merely by being reacted, while in aqueous solution, with an epihalohydrin. All available epihalohydrins, e.g. epichlorohydrin and epibromohydrin, may be utilized in the process of this invention, although epichlorohydrin is the preferred reagent for reasons of economy and availability.

Thus, the selected epihalohydrin is slowly admixed with the aqueous solution of the polyphosphorus amidoamine intermediate and the reaction is allowed to proceed at a temperature of from 30 to 100° C. and a pH level of from about 8 to 10 for a period of from about 1 to 4 hours; the latter pH level being obtained by adding a basic material, such as sodium hydroxide, to the system. Thereafter, the polymeric solution is cooled, diluted with water, and then stabilized by having added thereto sufficient acid to reduce its pH to a level of from about 3 to 6. Any suitable inorganic or organic acid, such as hydrochloric, sulfuric, nitric, oxalic and acetic acids, may be utilized to stabilize the resulting high molecular weight, chain extended polyphosphorus amidoamines. The resulting chain extended products are also typically retained as aqueous solutions since the latter form is convenient for use in any direct end use application or for any subsequent chemical reaction in which these novel products may be utilized.

The concentration of reactants to be used in the latter chain extension reaction is also left to the discretion of the practitioner, although the epihalohydrin is typically utilized in a concentration of from about 0.5 to 1.25 moles per each of the secondary nitrogens atoms which is present in the polyphosphorus amidoamine intermediate.

As previously noted, the chain extended polyphosphorus amidoamines of this invention may be effectively utilized in a variety of applications. Thus, these products may be incorporated into textiles as well as in a large number of synthetic polymeric materials, such as polyvinyl chloride, polyvinyl acetate, polystyrene, polyesters, and polyolefins, etc. wherein they may serve as anti-static agents and fire retardants, etc. Furthermore, our novel compositions may be used as adhesion promoters in adhesive systems based, for example, on polyvinyl acetate.

Of particular interest, is the use of these materials as pigment retention aids in paper and as flocculants. Thus, our novel materials have been successfully employed as pigment retention agents for papers prepared from all types of both cellulosic and combinations of cellulosic with non-cellulosic fibers. The cellulosic fibers which may be used include bleached and unbleached soda, neutral sulfite, semi-chemical, chemi-ground wood and ground wood; while applicable non-cellulosic fibers include polyamide, polyester and polyacrylic resin fibers as well as mineral fibers such as asbestos and glass. Furthermore, our novel polymeric materials may be effectively used in the presence of a wide variety of paper additives such as clay, talc, titanium dioxide, calcium carbonate, alum, sizing agents and dyes, etc., and may be employed in any of the conventional methods of preparing paper sheets and other paper products.

ez1lfux

Thus, in a typical paper making procedure, a slurry of pulp is fed into a beater or through continuous refiners where it is subjected to mechanical beating until it acquires the desired fiber length and degree of hydration. Pigments and other ingredients such as rosin, alum, dyes, etc. may be added before, during or after the latter mechanical processing step and the slurry is thereupon diluted to the desired solids content. While the aqueous solution of our novel polymeric materials may be added to the pulp slurry either before or after the other ingredients have been incorporated therein, it is usually preferable to add them last. After the solution of the polymeric material has been added to the slurry, the latter may then be further diluted. The resulting slurry is then passed onto a moving wire belt or onto a revolving screen-covered cylinder where a self-supporting web is formed. This web is then pressed to further reduce its water content and, after pressing, the sheet travels over a series of revolving steam-heated cylindrical driers.

The novel polymeric materials of this invention may also be employed to remove suspended organic solids from any type of aqueous medium wherein such solids may be encountered. Such media include, for example, raw, untreated water destined for human consumption or industrial use; industrial waste water; or, municipal sewage, etc. In practice, the flocculation procedure is typically conducted by the addition of our novel products to the aqueous medium containing the suspended, finely divided organic solids and, thereafter, separating the resulting flocs from their aqueous media by means of a settling out, filtration, or decantation operation. The distinct advantages derived from the use of our novel products are to be found in the rapid settling rates, low residual turbidities, and large, non-gummy floc formation which accompany their use.

The following examples will further illustrate the embodiment of this invention. In these examples, all parts given are by weight unless otherwise noted.

EXAMPLE I

This example illustrates the preparation of a chain extended polyphosphorus amidoamine typical of the novel products of this invention.

Thus, 55 parts of phosphorus oxychloride dissolved in 30 parts of benzene were admixed, over a period of two hours at a temperature which was not allowed to exceed 50° C., with a solution containing 92 parts of tetraethylenepentamine in 50 parts of water. Thereafter, an additional 250 parts of water were added and the reaction allowed to proceed at a temperature of 80° C. for a period of two hours. Upon removing the total benzene content of the system, the polyphosphorylamidopolyamine was recovered in the form of an aqueous solution containing 39.2%, by weight, of polymer solids.

Thereafter, 5.9 parts of epichlorohydrin and 16.6 parts of a 25%, by weight, aqueous sodium hydroxide solution were admixed, over a period of one hour at a temperature of 80° C., with 50 parts of the above prepared aqueous polyphosphorylamidopolyamine solution, which had been maintained at a pH level of 10, and an additional 50 parts of water. The resulting system was then admixed, over a period of one hour at a temperature of 80° C., with an additional 5.9 parts of epichlorohydrin and an additional 15.8 parts of the sodium hydroxide solution. Finally, 1.18 parts of epichlorohydrin and 14.8 parts of the sodium hydroxide solution were admixed with the reaction system over a period of 20 minutes at a temperature of 80° C. Upon completion of the reaction, the resulting reaction mix was cooled, diluted with 200 parts of water and stabilized at a pH level of 4.0 by the addition of 12.6 parts of a 35%, by weight, aqueous nitric acid solution.

The chain extended polyphosphorylamidopolyamine thus obtained was in the form of an aqueous solution containing 11.7%, by weight, of polymer solids. It exhibited an Intrinsic Viscosity (I.V.), as determined in water at 30° C., of 0.2.

EXAMPLE II

This example illustrates the preparation of another chain extended polyphosphorus amidoamine typical of the novel products of this invention.

Thus, 25.6 parts of phosphorus oxychloride were admixed, over a period of two hours at room temperature, with a solution containing 200 parts of benzene and 70 parts of a polyethylenepolyamine residue comprising the non-volatile amine by-product of the reaction between ethylene dichloride and ammonia. Agitation of the reaction mix was continued for an additional hour at room temperature whereupon 200 parts of water were added thereto and the total benzene portion of the system removed. The polyphosphorylamidopolyamine intermediate thus obtained was in the form of an aqueous solution containing 29.3%, by weight, of polymer solids.

Thereafter, 10 parts of epichlorohydrin and 16.5 parts of a 25%, by weight, aqueous sodium hydroxide solution were admixed, over a period of one hour at a temperature of 80° C., with 100 parts of the above prepared aqueous polyphosphorylamidopolyamine solution, which had been maintained at a pH level of 8.35. The reaction system was then admixed, over a period of one hour at a temperature of 80° C., with an additional 5 parts of epichlorohydrin. Upon completion of the reaction, the resulting reaction mix was cooled, diluted with 150 parts of water and stabilized at a pH level of 4.5 by the addition of the requisite amount of a 35%, by weight, aqueous nitric acid solution.

The chain extended polyphosphorylamidopolyamine thus obtained was in the form of an aqueous solution containing 10.2%, by weight, of polymer solids. It exhibited an I.V., as determined in water at 30° C., of 0.74.

EXAMPLE III

This example illustrates the preparation of still another polyphosphorusamidoamine typical of the novel products of this invention.

Thus, 23 parts of phosphorus trichloride were admixed, over a period of two hours at room temperature, with a solution containing 200 parts of benzene and 70 parts of a polyethylenepolyamine residue comprising the nonvolatile amine by-product of the reaction between ethylene dichloride and ammonia. Agitation of the reaction mix was continued for an additional hour at room temperature whereupon 250 parts of water were added thereto and the total benzene portion of the system removed. The polyphosphorusamidopolyamine intermediate thus obtained was in the form of an aqueous solution containing 35.9%, by weight, of polymer solids.

Thereafter, 5.9 parts of epichlorohydrin and 22.7 parts of a 25%, by weight, aqueous sodium hydroxide solution were admixed, over a period of one hour at a temperature of 80° C., with 75 parts of the above prepared aqueous polyphosphorusamidopolyamine solution, which had been maintained at a pH level of 8–9, and an additional 25 parts of water. The reaction system was then admixed, over a period of one hour at a temperature of 80° C., with an additional 14.1 parts of epichlorohydrin and an additional 14.8 parts of the sodium hydroxide solution. Upon completion of the reaction, the resulting reaction mix was cooled, diluted with 200 parts of water and stabilized at a pH level of 3.4 by the addition of the requisite amount of a 35%, by weight, aqueous nitric acid solution.

The chain extended polyphosphorusamidopolyamine thus obtained was in the form of an aqueous solution containing 13.6%, by weight, of polymer solids. It exhibited an I.V., as determined in water at 30° C., of 0.92.

The above described chain extension reaction was then repeated with the exception that: (a) a mixture of amines comprising hexamethylene diamine, bis-hexamethylene triamine and higher homologues of each of the latter amines; and, (b) a polyethylene amine residue comprising a mixture of pentaethylenehexamine, diaminoethyl triaminoethylamine, diaminoethyl triethylenetetramine, aminoethyl piperazine and higher homologues of each of the latter polyethylene amines; were each, respectively, utilized as the polyamine reagent in the preparation of the polyphosphorus amidopolyamine intermediate. The resulting chain extended products were comparable to the product prepared hereinabove.

Summarizing, it is thus seen that this invention provides for the preparation of novel, high molecular weight, chain extended polyphosphorus amidoamine compositions.

Variations may be made in procedures, proportions and materials without departing from the scope of this invention.

What we claim is:

1. The polymeric product resulting from the reaction of an epihalohydrin with a phosphorus-containing polyamine composition having a repetitive chemical structure corresponding to the formula

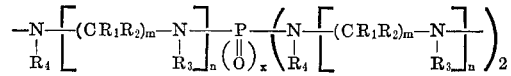

wherein $R_1$, $R_2$, $R_3$ and $R_4$ are radicals selected from the group consisting of hydrogen, alkyl and cycloalkyl radicals;

$m$ is an integer having a value of from 2 to 6 inclusive;

$n$ is an integer having a value of from 1 to 1000 inclusive; and, $x$ is an integer having a value of from 0 to 1 inclusive.

2. A process for the preparation of polymeric compositions which comprise the reaction product of an epihalohydrin with a phosphorus-containing polyamine composition having a repetitive chemical structure corresponding to the formula

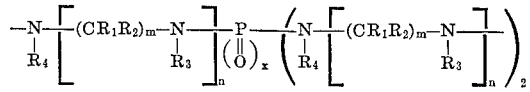

wherein $R_1$, $R_2$, $R_3$ and $R_4$ are radicals selected from the group consisting of hydrogen, alkyl and cycloalkyl radicals;

$m$ is an integer having a value of from 2 to 6 inclusive;

$n$ is an integer having a value of from 1 to 1000 inclusive; and, $x$ is an integer having a value of from 0 to 1 inclusive;

said process comprising the steps of admixing and subsequently reacting: (1) at least one low molecular weight polyamine corresponding to the formula

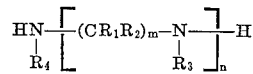

wherein $R_1$, $R_2$, $R_3$ and $R_4$ are radicals selected from the group consisting of hydogen, alkyl and cycloalkyl radicals; $m$ is an integer having a value of from 2 to 6 inclusive; and, $n$ is an integer having a value of from 1 to 1000 inclusive; and, (2) a phosphorus-containing reagent selected from the group consisting of phosphorus oxychloride, phosphorus trichloride, phosphorus oxybromide, phosphorus tribromide and the reaction products of anhydrous ammonia and a phosphoric acid anhydride; and, thereafter reacting the resulting polyamine composition with an epihalohydrin at a pH level of from about 8 to 10.

References Cited

UNITED STATES PATENTS 3,029,283  4/1962  Steinhauer _____ 260—551
3,311,594  3/1967  Earle _____ 260—2

SAMUEL H. BLECH, Primary Examiner

U.S. Cl. X.R.

162—164; 210—54; 260—2BP, 29.2R, 29.2EP, 860, 874, 896, 897, 899, Dig.16